United States Patent
Fujita

(10) Patent No.: US 8,953,429 B2
(45) Date of Patent: Feb. 10, 2015

(54) OPTICAL DISC DEVICE

(71) Applicant: Funai Electric Co., Ltd., Daito-shi, Osaka (JP)

(72) Inventor: Shinji Fujita, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 0 days.

(21) Appl. No.: 14/219,278

(22) Filed: Mar. 19, 2014

(65) Prior Publication Data

US 2014/0293762 A1  Oct. 2, 2014

(30) Foreign Application Priority Data

Mar. 29, 2013 (JP) ................................. 2013-073281

(51) Int. Cl.
*G11B 7/00* (2006.01)
*G11B 15/00* (2006.01)
*G11B 7/1263* (2012.01)

(52) U.S. Cl.
CPC .................................. *G11B 7/1263* (2013.01)
USPC ...................................... 369/116; 369/47.54

(58) Field of Classification Search
CPC .... G11B 7/126; G11B 7/0045; G11B 7/1263; G11B 19/247; G11B 19/28; G11B 19/20
USPC ............... 369/116, 44.37, 47.5, 47.51, 47.53, 369/120, 121, 47.54, 122
See application file for complete search history.

(56) References Cited

FOREIGN PATENT DOCUMENTS

| JP | 2007-42218 | * | 2/2007 | ..................... 369/116 |
| JP | 2011-159353 A | | 8/2011 | |

\* cited by examiner

*Primary Examiner* — Nabil Hindi
(74) *Attorney, Agent, or Firm* — Keating & Bennett, LLP

(57) ABSTRACT

An optical disc device includes an optical pickup unit including a semiconductor laser that shines a laser light, a light-receiving unit that receives the return light of the laser light, a high-frequency generating circuit that generates high-frequency signals, a pickup driver that generates a drive signal that drives the semiconductor laser based on the high-frequency signal, a control unit that controls the high-frequency generating circuit such that, in states in which playback of the optical disc is halted while irradiation with the laser light is being performed, the signal level of the high-frequency signal to be superimposed is set at a first signal level other than zero so as to be smaller than in states in which the playback is performed.

24 Claims, 5 Drawing Sheets

OPTICAL DISC DEVICE

BACKGROUND OF THE INVENTION

1. Field of the Invention

The present invention relates to an optical disc device which plays back optical discs.

2. Description of the Related Art

Optical discs such as compact discs (CDs), digital versatile discs (DVDs), and Blu-Ray discs (BDs, registered trademark) have come to be widely used in recent years. Furthermore, optical disc devices have been put into practical use as devices for reading, recording, and playing back information recorded on optical discs, such as audio data and image data. Some examples of widely known optical disc devices are CD players, DVD players, BD players, and CD-ROM drives connected to personal computers.

Optical disc devices are equipped with optical pickups for irradiating optical discs with laser light and reading data from them. Optical pickups have laser diodes that shine laser light onto the data recording surface of optical discs affixed to turntables on which they rotate.

Optical pickups in turn have light detectors, such as photodiodes, for receiving reflected light from the data recording surface. Optical pickups convert light into electrical signals by using light detectors and provide these signals as output.

Accurate reading of data from the optical disc requires tracking to make the light axis of the laser light track the center of the pit string formed on the optical disc. To accomplish this, the optical pickup device is internally equipped with an actuator for driving the objective lens in the radial direction of the optical disc and a tracking servo to control the actuator.

Technology which superimposes high-frequency signals on the drive signals of the laser diode that shines the laser light has been seen in practical applications in such an optical disc device in order to improve the quality of the signal from the optical pickup and to enhance servo performance.

However, irradiation of the optical disc with a high-frequency laser leads to the deterioration of optical discs. When the optical disc device is paused during disc access and goes on standby for long periods of time, in particular, there is a problem in that the high-frequency laser is constantly shining and causes a rapid progression in optical disc deterioration.

An optical disc device which ensures durability under playback light by turning high-frequency superimposition off in idle mode has been disclosed and proposed in connection with the technology described above (for example, see Japanese Patent Application Laid-Open Publication No. 2011-159353).

However, with the disclosed technology, deterioration of optical discs can be reduced, but because high-frequency superimposition is completely stopped, servo characteristics decline. Therefore, there is a possibility of servo misalignment occurring continuously in standby states (i.e., in idle mode).

SUMMARY OF THE INVENTION

Preferred embodiments of the present invention provide an optical disc device that reduces or prevents servo misalignment and deterioration of optical discs in standby states.

An optical disc device according to a preferred embodiment of the present invention includes an optical pickup unit which includes a laser irradiation unit that shines a laser light and a light-receiving unit that receives the return light of the laser light; a high-frequency generating unit that generates high-frequency signals; a drive unit that superimposes the high-frequency signal generated by the high-frequency generating unit onto a specified drive signal to generate the drive signal that drives the laser irradiation unit; and a control unit that is configured and programmed to control the high-frequency generating unit such that, in states in which playback of the optical disc is halted while irradiation with the laser light is being performed, the signal level of the high-frequency signal to be superimposed is set at a first signal level other than zero so as to be smaller than in states in which the playback is performed.

With this configuration, deterioration of the optical disc is significantly reduced or prevented in the standby state at the menu window after the disc is inserted, in pause states initiated by the user, in resume-halt states, and the like. Moreover, processing moves to playback in a short period of time compared to configurations in which the servo or laser is turned off while in these states. Thus, it is possible to significantly reduce or prevent optical disc deterioration and servo misalignment in standby states.

In addition, an optical disc device according to a preferred embodiment of the present invention may include a configuration in which the control unit is also configured and programmed to control the high-frequency generating unit so as to set the signal level of the high-frequency signal to be superimposed to zero in states in which the playback is halted while irradiation with the laser light is being performed.

With this configuration, significantly reducing or preventing deterioration of optical discs in the standby state is given priority over reducing servo misalignment in the standby state.

Furthermore, an optical disc device according to a preferred embodiment of the present invention may include a configuration in which the control unit is configured and programmed to control the high-frequency generating unit such that, in states in which the playback is halted while irradiation with the laser light is being performed, the high-frequency superimposition is performed after reducing the signal level of the high-frequency signal to be superimposed according to the length of time during which the playback is halted.

With this configuration, it is possible to give priority to reducing servo misalignment in the standby state when the time during which playback is halted is short and to give greater priority to reducing deterioration of optical discs in the standby state as the time during which playback is halted gets longer.

Moreover, an optical disc device according to a preferred embodiment of the present invention may include a configuration in which the control unit is configured and programmed to control the high-frequency generating unit such that, in states in which the playback is halted while irradiation with the laser light is being performed, the high-frequency superimposition is performed after increasing or decreasing the signal level of the high-frequency signal to be superimposed according to the type or layer of the optical disc whose playback is halted.

With this configuration, significantly reducing or preventing deterioration of the optical disc in the standby state is given priority in optical discs and layers that are vulnerable to deterioration of the recording surface by the reading laser, and significantly reducing or preventing servo misalignment in the standby state is given priority in optical discs and layers that are not vulnerable to deterioration of the recording surface by the reading laser.

In addition, an optical disc device according to a preferred embodiment of the present invention may include a configuration in which the control unit is configured and programmed to control the high-frequency generating unit such that, in states in which the playback is halted while irradiation with the laser light is being performed, the high-frequency superimposition is performed after increasing or decreasing the signal level of the high-frequency signal to be superimposed according to the operating status of the optical disc device.

With this configuration, as the risk of optical disc deterioration posed by the operating status increases (for example, in an operating status in which it takes a long time until forced cancellation in the standby state), it is possible to give greater priority to significantly reducing or preventing deterioration of optical discs in the standby state.

Furthermore, an optical disc device according to a preferred embodiment of the present invention preferably includes a configuration in which the control unit is configured and programmed to control the high-frequency generating unit such that, in states in which the playback is halted while irradiation with the laser light is being performed, if servo misalignment in the optical pickup unit is detected after the signal level of the high-frequency signal to be superimposed is decreased, then the high-frequency superimposition is performed after increasing the signal level of the high-frequency signal to be superimposed.

With this configuration, if servo misalignment has occurred, it is possible to give priority to significantly reducing or preventing servo misalignment in the standby state.

With various preferred embodiments of the present invention, it is possible to significantly reduce or prevent deterioration of optical discs in the standby state and also to avoid servo misalignment in the standby state.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below with reference to the drawings. Note that the preferred embodiments described and shown herein are just examples, and the present invention is in no way limited to the preferred embodiments described and shown herein.

Figure 1:
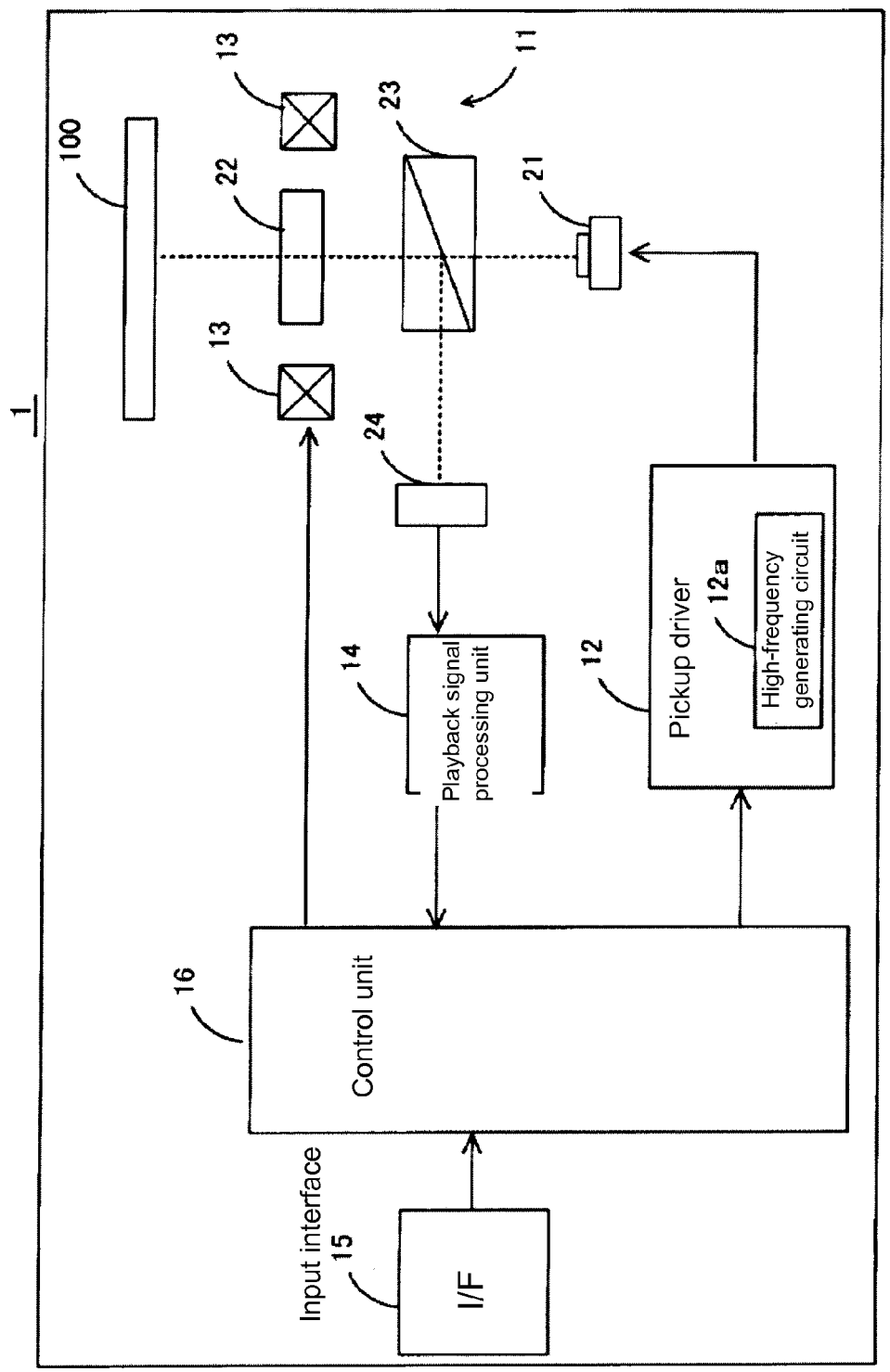
FIG. 1 is a block diagram showing a configuration of an optical disc device according to a preferred embodiment of the present invention.

FIG. 1 is a configuration diagram showing an optical disc device 1 according to a preferred embodiment of the present invention. The optical disc device 1 can record data pertaining to television broadcasting on an optical disc 100 such as a Blu-ray disc, for example. Furthermore, the optical disc device 1 can play back data recorded on the optical disc 100 and output it to an external device (such as an LCD monitor; not shown) connected to the optical disc device 1.

As shown in FIG. 1, the optical disc device 1 is equipped with an optical pickup unit 11, a pickup driver 12, a position control unit 13, a playback signal processing unit 14, an input interface 15, and a control unit 16.

The optical pickup unit 11 is equipped with a semiconductor laser 21 which shines laser light, an objective lens 22, a polarization beam splitter 23, and a light-receiving unit 24 which serve as the optics that define the light path of the laser light.

The semiconductor laser 21 oscillates at a specified period according to the drive signal that is input from the pickup driver 12 and shines laser light. The semiconductor laser 21 includes, for example, a laser diode that can shine laser light in the 650 nm band for DVDs or laser light in the 780 nm band for CDs.

Note that the present preferred embodiment shows the semiconductor laser 21 as one example of the device that shines lasers, but formats that shine laser light using other devices may also be used.

The objective lens 22 and the polarization beam splitter 23 guide the laser light that shines from the semiconductor laser 21 onto the optical disc 100 while also guiding the return light formed by reflecting laser light off the optical disc 100 to the light-receiving unit 24.

The light-receiving unit 24 includes light-receiving elements such as photodiodes, converts received light into electrical signals, and outputs these signals. The light-receiving unit 24 is provided with light-receiving regions divided into quadrants, for example, and is able to perform photoelectric conversion and output electrical signals independently for each region. Doing so enables output of playback signals RF and various types of control signals.

The pickup driver 12 generates drive signals that drive the semiconductor laser 21. These drive signals are generated by the high-frequency superimposition method. With the high-frequency superimposition method, drive signals are generated by superimposing high-frequency signals on the source drive signals with the goal of reducing return light noise.

For this reason, the pickup driver 12 is equipped with a high-frequency generating circuit 12a that generates high-frequency signals. The high-frequency generating circuit 12a generates high-frequency signals of a specified amplitude according to the control signal that is input from the control unit 16.

The position control unit 13 controls the position of the objective lens 22 based on the tracking error signal TE and focus error signal FE that are input from the control unit 16. The position control unit 13 is equipped with a two-axis actuator that changes the position of the objective lens 22.

The position control unit 13 is configured and programmed to control tracking to make the objective lens 22 follow the tracks of the optical disc based on the tracking error signal TE. Moreover, the position control unit 13 is configured and programmed to control focus to adjust the focal distance of the objective lens 22 based on the focus error signal FE.

The playback signal processing unit 14 demodulates the playback signal RF and control signals that are input from the optical pickup unit 11. In addition, the playback signal processing unit 14 runs error correction processing on the demodulated playback signal RF.

The input interface 15 is a tuner that acquires television broadcast signals, for example. The data acquired by the input interface 15 is converted by the optical pickup unit 11 into the data written onto the optical disc 100.

The control unit 16 preferably is an operations processing device (e.g., a digital signal processor or microprocessor) that is configured and programmed to comprehensively control the drive of the optical disc device 1. The control unit 16 is configured and programmed to generate the tracking error signal TE, the focus error signal FE, and the like based on control signals demodulated by the playback signal processing unit 14 and outputs them to the position control unit 13. Furthermore, the control unit 16 is configured and programmed to order the high-frequency generating circuit 12a to change the amount of superimposition in high-frequency superimposition.

With the high-frequency superimposition method, the light emission level of the reading laser is changed by changing the high-frequency superimposition amplitude. The control unit is configured and programmed to set the high-frequency superimposition amplitude by outputting a specified control signal to the high-frequency generating circuit 12a. Once it has received this control signal, the high-frequency generating circuit 12a starts generating the high-frequency signal based on the specified high-frequency superimposition amplitude.

Figure 2:
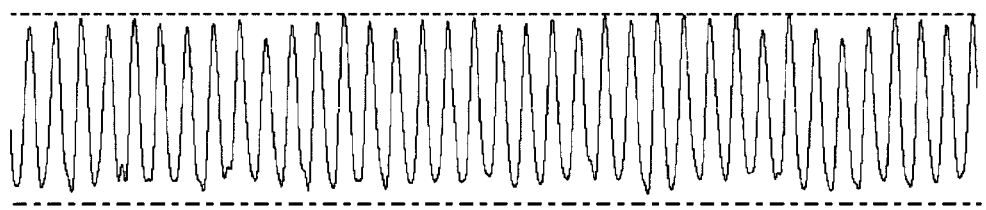
FIG. 2 is a waveform diagram showing an amount of light emitted by a reading laser when performing normal superimposition.
Figure 3:
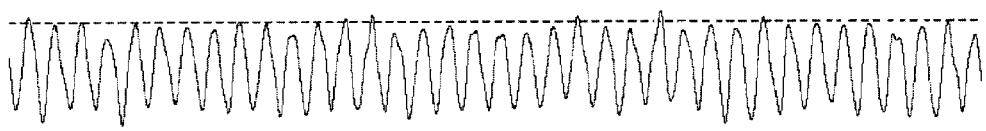
FIG. 3 is a waveform diagram showing an amount of light emitted by a reading laser when performing one-half superimposition.
Figure 4:
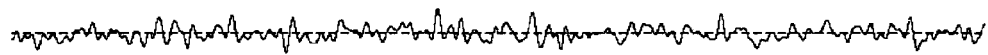
FIG. 4 is a waveform diagram showing an amount of light emitted by a reading laser when superimposition is turned off.

Next, the relationship between the amount of light emitted by the reading laser and the error rate in the present preferred embodiment will be described. FIG. 2 shows the amount of light emitted by the reading laser with ordinary high-frequency superimposition being performed. Moreover, FIG. 3 shows the amount of light emitted by the reading laser with one-half high-frequency superimposition being performed. In addition, FIG. 4 shows the amount of light emitted by the reading laser with no high-frequency superimposition being performed.

Figure 5:
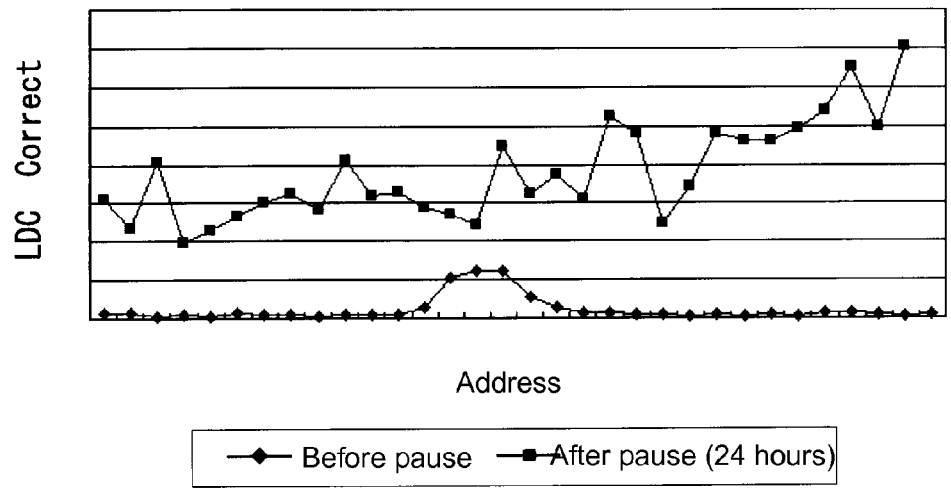
FIG. 5 is a model diagram showing error rates after 24 hours of irradiation when performing normal superimposition.
Figure 6:
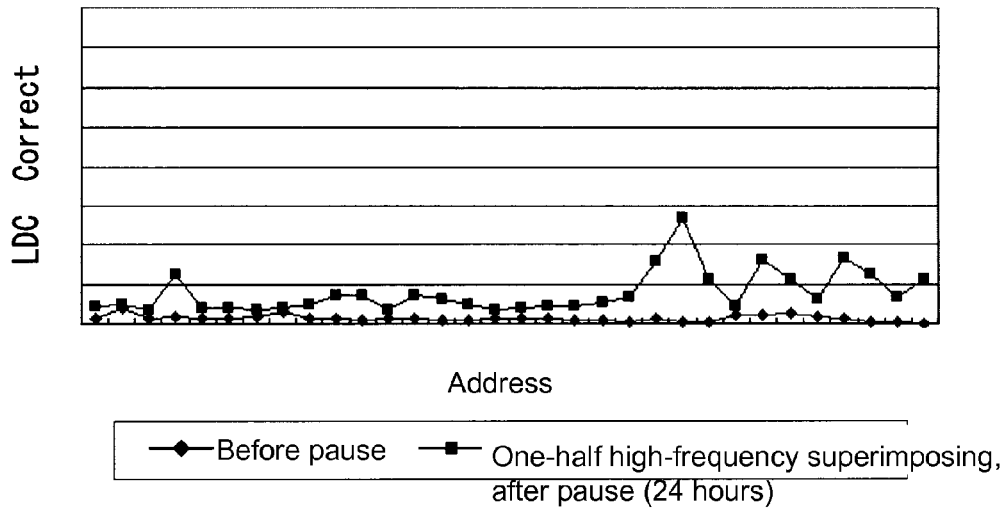
FIG. 6 is a model diagram showing error rates after 24 hours of irradiation when performing one-half superimposition.
Figure 7:
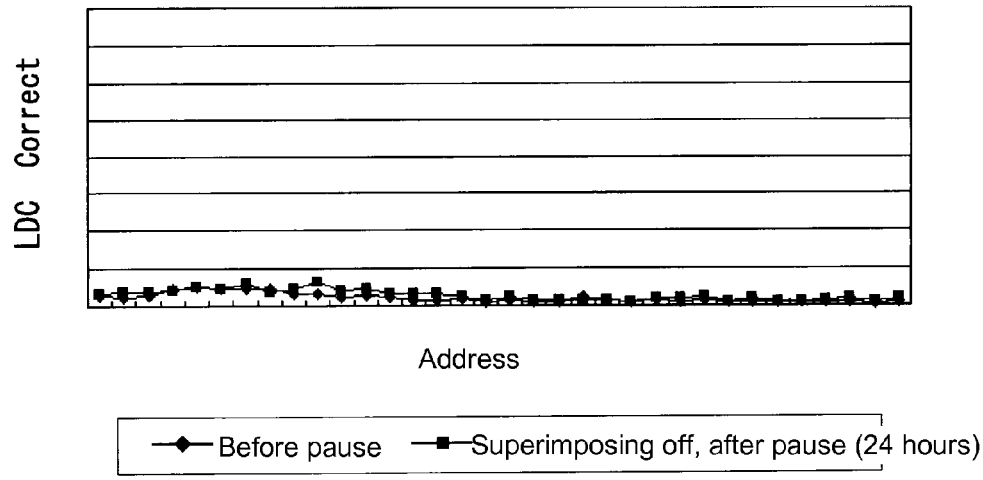
FIG. 7 is a model diagram showing error rates after 24 hours of irradiation when superimposition is turned off.

FIGS. 5 to 7 show error rates measured using long distance code (LDC) after 24 hours of continuous irradiation by the respective reading lasers described above. FIG. 5 shows the error rates when normal high-frequency superimposition was performed, FIG. 6 shows the error rates when one-half high-frequency superimposition was performed, and FIG. 7 shows the error rates when high-frequency superimposition was not performed.

As shown in FIGS. 5 to 7, the more the amount of superimposition is reduced during standby and the more the laser power that hits the disc surface is reduced, the more the deterioration of the optical disc is reduced or prevented. When high-frequency superimposition is turned completely off, however, servo misalignment can occur in a paused state.

In light of this, the control unit 16 of the present preferred embodiment is configured and programmed to execute control to change the amount of high-frequency superimposition according to specified conditions while in a paused state.

First, as a premise, high-frequency superimposition is not off for long periods of time in the present preferred embodiment but is kept off only temporarily because, when high-frequency superimposition is always off, servo misalignment can occur. Based on this, the amount of superimposition is controlled according to the following conditions described below.

Note that in the following, the signal level of the high-frequency signal that is used in high-frequency superimposition is given as "level A," and the signal level of the high-frequency signal under normal conditions is given as "level M." Note that the signal level of the high-frequency signal that serves as the amount of read light emitted under normal conditions shown in FIG. 2 is used an example of a specific value for level M. Level M is the maximum value for level A, and the relationship Level A≤Level M is always established.

(1) Level A is changed according to the length of the pause.

(2) Level A is changed according to the type or layer of the optical disc that is being played back.

(3) Level A is changed according to the playback status (pause, menu window display, etc.) of the optical disc.

(4) Level A is changed according to whether servo misalignment occurs during a pause.

Under pattern (1), the control unit 16 is configured and programmed to control the high-frequency generating circuit 12a such that the amount of superimposition decreases as the length of the pause grows longer. For example, the initial value of level A is set to level M, and the amount of superimposition is reduced by a specified amount (such as about 10% of level M) every time a specified unit of time (such as approximately 10 minutes) elapses. Note that the specified amount need not always be an identical amount; for example, the specified amount may be a different amount for each time the specified unit of time elapses. By doing so, the stability of the servo can be given priority when the pause time is short. When the length of the pause grows longer, however, level A is reduced, giving priority to preventing deterioration.

Under pattern (2), the control unit 16 is configured and programmed to control the high-frequency generating circuit 12a such that the amount of superimposition is decreased according to the type of optical disc detected in advance and the layer for which playback is halted. For example, on optical discs that are prone to deterioration of the recording surface caused by reading lasers (such as BDXLs (registered trademark)), level A is reduced to somewhere between 0 and ½ of level M, thereby giving priority to preventing deterioration. Meanwhile, on optical discs that are not vulnerable to deterioration of the recording surface (such as DVDs and BDs (registered trademark) that have only one or two recording layers), level A is kept to at least one half of level M, thus giving priority to stability of the servo.

Furthermore, on layers that are prone to deterioration of the recording surface caused by reading lasers, preventing deterioration is given priority by reducing level A to about ¼ of level M or below. Meanwhile, on layers that are not prone to deterioration of the recording surface caused by reading lasers, servo stability is given priority by keeping level A between about ¼ and about ½ of level M.

With pattern (3), the level is changed according to the playback status of the optical disc. The following are conceivable situations in which irradiation with reading lasers continues in a state in which normal playback processing is not being performed:

In a paused state resulting from a pause command during playback

In a state in which a menu is displayed after moving to a menu window

In a resume-halt state after a resume-halt command is received

Note that in the state in which a menu is displayed, the servo is turned on, and the track-on state is maintained such that playback can be started promptly when a playback command is issued in the menu window. Moreover, in the resume-halt state, playback appears to be halted from the user's perspective, but the servo is turned on, and the track-on state is maintained such that playback can be started promptly from the resume-halt position.

The shorter the length of time until a forced cancel is performed under device specifications for the above states, the higher level A is kept, giving servo stability priority. Meanwhile, in states with a short time until a forced cancel is performed or in states that do not perform a forced cancel, level A is set low, giving priority to preventing deterioration.

For instance, in the example, it is assumed that the time until forced cancel was shortest in the resume-halt state, while the time until forced cancel was longest in the pause state. In this case, level A is kept to at least about one half of level M in the resume-halt state. Meanwhile, in the paused state, level A is reduced to between 0 and about ½ level M.

In pattern (4), when level A is low and servo misalignment is detected during a pause or the like, level A is increased only by a specified amount (such as about 10% of level M). When servo misalignment is detected again after the increase, level A is increased only by the specified amount every time servo misalignment occurs. Note that when an optical disc is exchanged during playback, level A is returned to its initial value.

The decision of which of the patterns (1) through (4) described above will be used may be determined in advance at the time of factory shipment of the optical disc device 1 or the like, for example, or may be determined based on the results of selections received via an operating unit (not shown) after the control unit 16 displays a settings window on-screen and waits for a user selection. Alternatively, some combination of the patterns (1) through (4) may be used, for example.

Figure 8:
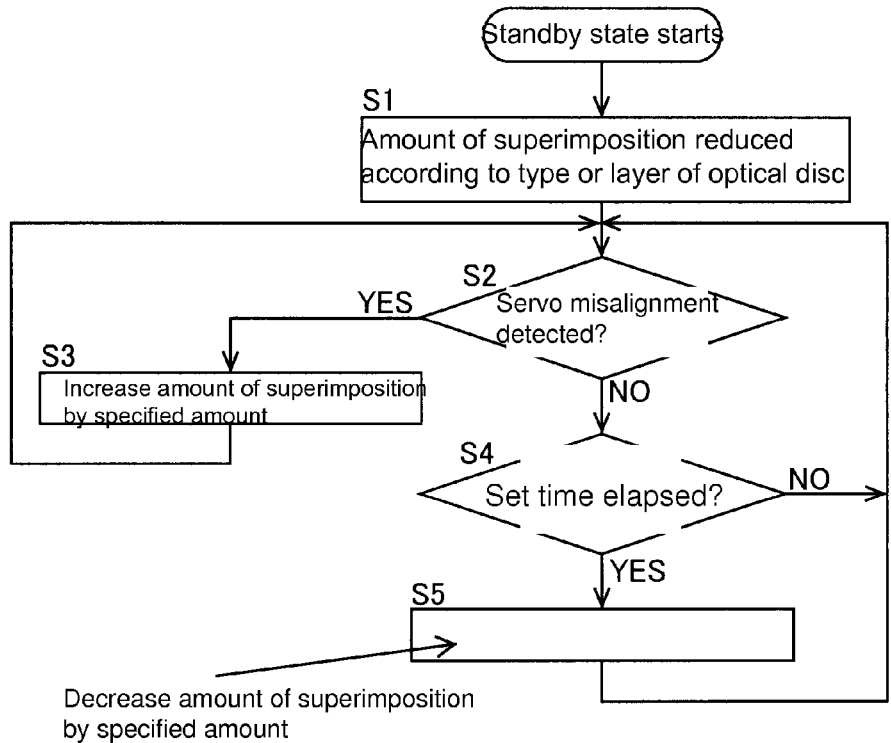
FIG. 8 is a flowchart showing an example of setting an amount of superimposition.

For example, in modes that implement pattern (1), pattern (2), and pattern (4) in combination, the control unit 16 may execute control as shown in FIG. 8. When the standby state, i.e., the state in which optical disc playback is halted while irradiation with laser light is being performed, begins, the control unit 16 first reduces the amount of superimposition according to the type or layer of the optical disc (step S1). Then, the control unit 16 determines whether or not servo misalignment has been detected (step S2). Note that servo misalignment may be judged to be detected only by a single detection of servo misalignment, or servo misalignment may be judged to be detected when at least a defined number of servo misalignment detections are made within a defined period of time. When servo misalignment is judged to be detected, the control unit 16 increases the amount of superimposition by a specified amount (step S3) and then returns to the processing of step S2. On the other hand, when servo misalignment is judged to be not detected, the control unit 16 determines whether or not a set period of time has elapsed (step S4). If the set period of time is judged to not have elapsed, the control unit 16 returns to the processing of step S2. In addition, if the set period of time is judged to have elapsed, the control unit 16 resets the clock, starts the clock again, decreases the amount of superimposition by a specified amount (step S5), and then returns to the processing of step S2. Note that the specified amount in step S3 and the specified amount in step S5 may be the same or different. Furthermore, when the standby state is canceled, handling of an interrupt that terminates the control shown in FIG. 8 is run. The control shown in FIG. 8 then terminates.

Figure 9:
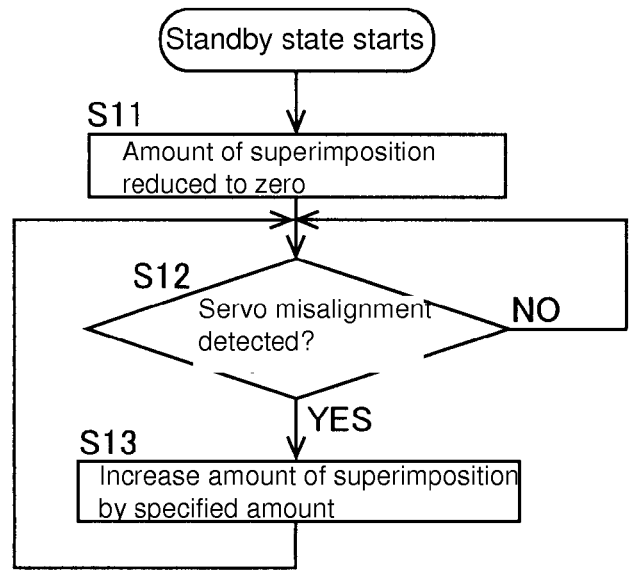
FIG. 9 is a flowchart showing another example of setting an amount of superimposition.

For another example, in modes that combine pattern (4) with control that gives first priority to decreasing optical disc deterioration in the standby state and therefore sets the signal level of the high-frequency signal to be superimposed to zero, the control unit 16 may execute control as shown in FIG. 9. When the standby state, i.e., the state in which optical disc playback is halted while irradiation with laser light is being performed, begins, the control unit 16 first reduces the amount of superimposition to zero (step S11). Afterwards, the control unit 16 determines whether or not servo misalignment has been detected (step S12). Note that servo misalignment may be judged to be detected only by a single detection of servo misalignment, or servo misalignment may be judged to be detected when at least a defined number of servo misalignment detections are made within a defined period of time. When servo misalignment is judged to be detected, the control unit 16 increases the amount of superimposition by a specified amount (step S13) and then returns to the processing of step S12. Meanwhile, when servo misalignment is judged to be not detected, the control unit 16 returns to the processing of step S12 without changing the amount of superimposition. Note that when the standby state is canceled, handling of an interrupt that terminates the control shown in FIG. 9 is run. The control shown in FIG. 9 then terminates.

Figure 10:
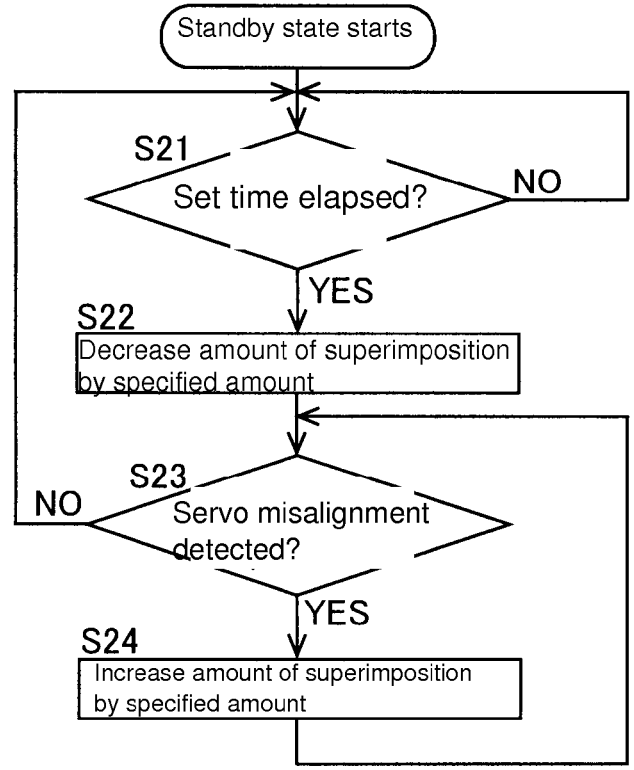
FIG. 10 is a flowchart showing yet another example of setting an amount of superimposition.

For another example, in modes that implement pattern (1) and pattern (4) in combination, the control unit 16 may execute control as shown in FIG. 10. When the standby state, i.e., the state in which optical disc playback is halted while irradiation with laser light is being performed, begins, the control unit 16 first determines whether or not a set period of time has elapsed (step S21). If the set period of time is judged to not have elapsed, the control unit 16 returns to the processing of step S21. Moreover, if the set period of time is judged to have elapsed, the control unit 16 resets the clock, starts the clock again, decreases the amount of superimposition by a specified amount (step S22), and then determines whether or not servo misalignment has been detected (step S23). Note that servo misalignment may be judged to be detected only by a single detection of servo misalignment, or servo misalignment may be judged to be detected when at least a defined number of servo misalignment detections are made within a defined period of time. When servo misalignment is judged to be not detected, processing returns to step S21. On the other hand, when servo misalignment is judged to be detected, the control unit 16 increases the amount of superimposition by a specified amount (step S24) and then returns to the processing of step S23. Note that when the standby state is canceled, handling of an interrupt that terminates the control shown in FIG. 10 is performed. The control shown in FIG. 10 then terminates.

The optical disc device 1 according to the present preferred embodiment includes an optical pickup unit 11 which includes a semiconductor laser 21 that shines laser light and a light-receiving unit 24 that receives the return light of the laser light. It also includes a high-frequency generating circuit 12a that generates high-frequency signals and a pickup driver 12 that generates, based on high-frequency signals, drive signals that drive the semiconductor laser 21. It also has a control unit 16 that is configured and programmed to control the high-frequency generating circuit 12a such that, in the state in which optical disc playback is halted while irradiation with laser light is being performed, the signal level of the high-frequency signal to be superimposed is set at a first signal level other than zero so as to be smaller than in the state in which playback is performed.

Therefore, deterioration of the optical disc is significantly reduced or prevented in the standby state at the menu window after the disc is inserted, in pause states initiated by the user, in resume-halt states, and the like. Furthermore, processing can move to playback in a shorter period of time than in configurations in which the servo or laser is turned off while in these states.

Moreover, with the present preferred embodiment, the control unit 16 is also configured and programmed to control the high-frequency generating circuit 12a so as to set the signal level of the high-frequency signal to be superimposed to zero in states in which playback is halted while irradiation with laser light is being performed.

Therefore, significantly reducing or prevented deterioration of optical discs in the standby state is given priority over reducing servo misalignment in the standby state.

In addition, with the present preferred embodiment, in pattern (1), the control unit 16 controls the high-frequency generating circuit 12a such that, in states in which playback is halted while irradiation with laser light is being performed, the signal level of the high-frequency signal to be superimposed is reduced according to the length of time during which playback is halted, and the high-frequency superimposition is then performed.

Therefore, it is possible to give priority to reducing or preventing servo misalignment in the standby state if the time during which playback is halted is short and to give greater priority to reducing deterioration of optical discs in the standby state as the time during which playback is halted becomes longer.

Furthermore, with the present preferred embodiment, in pattern (2), the control unit 16 controls the high-frequency generating circuit 12a such that, in states in which playback is halted while irradiation with laser light is being performed, the signal level of the high-frequency signal to be superimposed is increased or decreased according to the type or layer of the optical disc whose playback is halted before performing the high frequency superimposition.

Because of this, reducing deterioration of the optical disc in the standby state is given priority in optical discs and layers that are vulnerable to deterioration of the recording surface caused by the reading laser, and significantly reducing or preventing servo misalignment in the standby state is given priority in optical discs and layers that are not vulnerable to deterioration of the recording surface caused by the reading laser.

Moreover, with the present preferred embodiment, in pattern (3), the control unit 16 controls the high-frequency generating circuit 12a such that, in states in which playback is halted while irradiation with laser light is being performed, the signal level of the high-frequency signal to be superimposed is increased or decreased according to the operating status of the optical disc device 1 before performing the high frequency superimposition.

For this reason, as the risk of optical disc deterioration posed by the operating status increases (for example, in an operating status in which it takes a long time until forced cancellation in the standby state), it is possible to give greater priority to significantly reducing or preventing deterioration of optical discs in the standby state.

In addition, with the present preferred embodiment, in pattern (4), the control unit 16 controls the high-frequency generating circuit 12a such that, in states in which playback is halted while irradiation with the laser light is being performed, if servo misalignment in the optical pickup unit is detected after the signal level of the high-frequency signal to be superimposed is decreased, then the signal level of the high-frequency signal to be superimposed is increased before performing the high frequency superimposition.

Therefore, reducing servo misalignment in the standby state is given priority when servo misalignment has occurred.

OTHER PREFERRED EMBODIMENTS

The present invention was described above by describing and illustrating preferred embodiments and working examples. However, the present invention is not necessarily limited to the preferred embodiments and working examples and can be carried out with a variety of modifications within the scope of the technological concept thereof.

Accordingly, preferred embodiments and working examples of the present invention can also be applied to the following modes described above.

In the preferred embodiment, the various functions pertaining to processing that changes amplitude in the present invention are preferably made possible by executing programs on an operations processing device such as a microprocessor, but it is also possible to adopt modes in which these functions are realized by a plurality of circuits.

In the preferred embodiments, pausing during playback, menu window display, and resuming halt were given as examples of states in which reading laser light continues to shine. However, preferred embodiments are also possible which cause the signal level of the high-frequency signal to be superimposed smaller in standby states other than these than in a state in which playback is performed with this signal level being set to a first signal level other than zero.

In addition to the configurations shown in the preferred embodiments of the present invention, display devices, personal computers, mobile terminal devices, and in-vehicle navigation devices that are equipped with optical disc devices are among the possible devices to which preferred embodiments of the present invention can be applied.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An optical disc device comprising:
    an optical pickup unit including a laser irradiation unit that shines a laser light and a light-receiving unit that receives return light of the laser light;
    a high-frequency generating unit configured to generate a high-frequency signal;
    a drive unit configured to superimpose the high-frequency signal generated by the high-frequency generating unit onto a specified drive signal to generate the drive signal that drives the laser irradiation unit; and
    a control unit that controls the high-frequency generating unit such that, in states in which playback of the optical disc is halted while irradiation with the laser light is being performed, a signal level of the high-frequency signal to be superimposed is set at a first signal level other than zero so as to be smaller than in states in which the playback is performed; wherein
    the control unit controls the high-frequency generating unit such that, if servo misalignment in the optical pickup unit is detected after the signal level of the high-frequency signal to be superimposed is decreased, then the signal level of the high-frequency signal to be superimposed is increased, and the high-frequency superimposition is then performed.

2. The optical disc device according to claim 1, wherein the control unit controls the high-frequency generating unit so as to set the signal level of the high-frequency signal to be superimposed to zero in states in which the playback is halted while irradiation with the laser light is being performed.

3. The optical disc device according to claim 1, wherein the control unit controls the high-frequency generating unit such that, in states in which the playback is halted while irradiation with the laser light is being performed, the high-frequency superimposition is performed after reducing the signal level of the high-frequency signal to be superimposed according to a length of time during which the playback is halted.

4. The optical disc device according to claim 1, wherein the control unit controls the high-frequency generating unit such that, in states in which the playback is halted while irradiation with the laser light is being performed, the high-frequency superimposition is performed after increasing or decreasing the signal level of the high-frequency signal to be superimposed according to a type or layer of the optical disc for which the playback is halted.

5. The optical disc device according to claim 1, wherein the control unit controls the high-frequency generating unit such that, in states in which the playback is halted while irradiation with the laser light is being performed, the high-frequency superimposition is performed after increasing or decreasing the signal level of the high-frequency signal to be superimposed according to an operating status of the optical disc device.

6. An optical disc device comprising:
an optical pickup unit including a laser irradiation unit that shines a laser light and a light-receiving unit that receives return light of the laser light;
a high-frequency generating unit configured to generate a high-frequency signal;
a drive unit configured to superimpose the high-frequency signal generated by the high-frequency generating unit onto a specified drive signal to generate the drive signal that drives the laser irradiation unit; and
a control unit that controls the high-frequency generating unit such that, in states in which playback of the optical disc is halted while irradiation with the laser light is being performed, a signal level of the high-frequency signal to be superimposed is set at a first signal level other than zero so as to be smaller than in states in which the playback is performed; wherein
the control unit controls the high-frequency generating unit such that, in states in which the playback is halted while irradiation with the laser light is being performed, the high-frequency superimposition is performed after reducing the signal level of the high-frequency signal to be superimposed according to a length of time during which the playback is halted.

7. The optical disc device according to claim 6, wherein the control unit controls the high-frequency generating unit so as to set the signal level of the high-frequency signal to be superimposed to zero in states in which the playback is halted while irradiation with the laser light is being performed.

8. The optical disc device according to claim 6, wherein the control unit controls the high-frequency generating unit such that, in states in which the playback is halted while irradiation with the laser light is being performed, the high-frequency superimposition is performed after increasing or decreasing the signal level of the high-frequency signal to be superimposed according to a type or layer of the optical disc for which the playback is halted.

9. The optical disc device according to claim 6, wherein the control unit controls the high-frequency generating unit such that, in states in which the playback is halted while irradiation with the laser light is being performed, the high-frequency superimposition is performed after increasing or decreasing the signal level of the high-frequency signal to be superimposed according to an operating status of the optical disc device.

10. An optical disc device comprising:
an optical pickup unit including a laser irradiation unit that shines a laser light and a light-receiving unit that receives return light of the laser light;
a high-frequency generating unit configured to generate a high-frequency signal;
a drive unit configured to superimpose the high-frequency signal generated by the high-frequency generating unit onto a specified drive signal to generate the drive signal that drives the laser irradiation unit; and
a control unit that controls the high-frequency generating unit such that, in states in which playback of the optical disc is halted while irradiation with the laser light is being performed, a signal level of the high-frequency signal to be superimposed is set at a first signal level other than zero so as to be smaller than in states in which the playback is performed; wherein
the control unit controls the high-frequency generating unit such that, in states in which the playback is halted while irradiation with the laser light is being performed, the high-frequency superimposition is performed after increasing or decreasing the signal level of the high-frequency signal to be superimposed according to a type or layer of the optical disc for which the playback is halted.

11. The optical disc device according to claim 10, wherein the control unit controls the high-frequency generating unit so as to set the signal level of the high-frequency signal to be superimposed to zero in states in which the playback is halted while irradiation with the laser light is being performed.

12. The optical disc device according to claim 10, wherein the control unit controls the high-frequency generating unit such that, in states in which the playback is halted while irradiation with the laser light is being performed, the high-frequency superimposition is performed after increasing or decreasing the signal level of the high-frequency signal to be superimposed according to an operating status of the optical disc device.

13. The optical disc device according to claim 1, wherein the control unit controls the high-frequency generating unit such that (i) the signal level of the high-frequency signal to be superimposed is set to a same level as is used during playback until a predetermined amount of time has passed, and (ii) the signal level of the high-frequency signal to be superimposed is reduced by a specified amount each time the predetermined amount of time has passed.

14. The optical disc device according to claim 6, wherein the control unit controls the high-frequency generating unit such that (i) the signal level of the high-frequency signal to be superimposed is set to a same level as is used during playback until a predetermined amount of time has passed, and (ii) the signal level of the high-frequency signal to be superimposed is reduced by a specified amount each time the predetermined amount of time has passed.

15. The optical disc device according to claim 10, wherein the control unit controls the high-frequency generating unit such that (i) the signal level of the high-frequency signal to be superimposed is set to a same level as is used during playback until a predetermined amount of time has passed, and (ii) the signal level of the high-frequency signal to be superimposed is reduced by a specified amount each time the predetermined amount of time has passed.

16. The optical disc device according to claim 1, wherein the control unit controls the high-frequency generating unit such that the signal level of the high-frequency signal to be superimposed is set to be between 0 and ½ of a maximum level used during playback based on a type of optical disc detected by the optical disc device.

17. The optical disc device according to claim 6, wherein the control unit controls the high-frequency generating unit such that the signal level of the high-frequency signal to be superimposed is set to be between 0 and ½ of a maximum level used during playback based on a type of optical disc detected by the optical disc device.

18. The optical disc device according to claim 10, wherein the control unit controls the high-frequency generating unit such that the signal level of the high-frequency signal to be superimposed is set to be between 0 and ½ of a maximum level used during playback based on a type of optical disc detected by the optical disc device.

19. The optical disc device according to claim 1, wherein the control unit controls the high-frequency generating unit such that the signal level of the high-frequency signal to be superimposed is set based on a playback state of the optical disc.

20. The optical disc device according to claim 6, wherein the control unit controls the high-frequency generating unit such that the signal level of the high-frequency signal to be superimposed is set based on a playback state of the optical disc.

21. The optical disc device according to claim 10, wherein the control unit controls the high-frequency generating unit such that the signal level of the high-frequency signal to be superimposed is set based on a playback state of the optical disc.

22. The optical disc device according to claim 19, wherein
when the playback state is determined to be a state which necessitates that playback be started immediately, the signal level of the high-frequency signal to be superimposed is set at or above ½ of a maximum level used during playback; and
when the playback state is determined to be a state which does not necessitate that playback be started quickly, the signal level of the high-frequency signal to be superimposed is set to be between 0 and ½ of the maximum level used during playback based.

23. The optical disc device according to claim 20, wherein
when the playback state is determined to be a state which necessitates that playback be started immediately, the signal level of the high-frequency signal to be superimposed is set at or above ½ of a maximum level used during playback; and
when the playback state is determined to be a state which does not necessitate that playback be started quickly, the signal level of the high-frequency signal to be superimposed is set to be between 0 and ½ of the maximum level used during playback based.

24. The optical disc device according to claim 21, wherein
when the playback state is determined to be a state which necessitates that playback be started immediately, the signal level of the high-frequency signal to be superimposed is set at or above ½ of a maximum level used during playback; and
when the playback state is determined to be a state which does not necessitate that playback be started quickly, the signal level of the high-frequency signal to be superimposed is set to be between 0 and ½ of the maximum level used during playback based.

* * * * *